United States Patent
Karame et al.

(10) Patent No.: US 11,503,036 B2
(45) Date of Patent: Nov. 15, 2022

(54) METHODS OF ELECTING LEADER NODES IN A BLOCKCHAIN NETWORK USING A ROLE-BASED CONSENSUS PROTOCOL

(71) Applicant: NEC Laboratories Europe GmbH, Heidelberg (DE)

(72) Inventors: Ghassan Karame, Heidelberg (DE); Wenting Li, Heidelberg (DE)

(73) Assignee: NEC CORPORATION, Tokyo (JP)

(*) Notice: Subject to any disclaimer, the term of this patent is extended or adjusted under 35 U.S.C. 154(b) by 400 days.

(21) Appl. No.: 16/351,637

(22) Filed: Mar. 13, 2019

(65) Prior Publication Data
US 2020/0296111 A1    Sep. 17, 2020

(51) Int. Cl.
| | | |
|---|---|---|
| H04L 29/06 | (2006.01) | |
| H04L 9/06 | (2006.01) | |
| H04L 9/32 | (2006.01) | |
| H04L 9/40 | (2022.01) | |
| H04L 9/00 | (2022.01) | |

(52) U.S. Cl.
CPC .......... H04L 63/105 (2013.01); H04L 9/0637 (2013.01); H04L 9/3218 (2013.01); *H04L 9/50* (2022.05)

(58) Field of Classification Search
CPC .............. H04L 63/105; H04L 9/0637; H04L 9/3218; H04L 2209/38; H04L 2209/56; H04L 9/323
USPC ........................................................... 726/4
See application file for complete search history.

(56) References Cited

U.S. PATENT DOCUMENTS

| | | | |
|---|---|---|---|
| 9,992,022 B1 | 6/2018 | Chapman et al. | |
| 10,534,634 B2* | 1/2020 | Yang et al. | G06F 9/48 |
| 10,554,407 B1* | 2/2020 | Greco et al. | H04L 29/06 |
| 10,802,869 B2* | 10/2020 | Yang et al. | G06F 9/48 |
| 10,965,466 B2* | 3/2021 | Hsueh | H04L 29/06 |
| 2017/0331896 A1 | 11/2017 | Holloway et al. | |

(Continued)

FOREIGN PATENT DOCUMENTS

| | | | | |
|---|---|---|---|---|
| CN | 108182635 A * | 6/2018 | | G06Q 40/04 |
| WO | WO 2018119585 A1 | 7/2018 | | |

OTHER PUBLICATIONS

Wenbo Wang et al., A Survey on Consensus Mechanisms and Mining Strategy Management in Blockchain Networks, Jan. 30, 2019, IEEE Access. (Year: 2019).*

(Continued)

*Primary Examiner* — Bennett M Sigmond
*Assistant Examiner* — George N. Proios
(74) *Attorney, Agent, or Firm* — Leydig, Voit & Mayer, Ltd.

(57) ABSTRACT

A method for electing a leader in a blockchain network using a role-based consensus protocol includes generating a new block by a node in the blockchain network and computing an effective resources metric for the node based on a role of the node, resources of the node and a role-based weight profile for the resources of the node. Eligibility proof of the node is generated based on eligibility information that includes a blockheader of the new block, an identity of the node, a difficulty target, T, of the blockchain network, and the effective resources metric. The new block and the eligibility proof is broadcast to the blockchain network, to enable one or more other nodes in the blockchain network to verify eligibility of the node as a leader.

13 Claims, 2 Drawing Sheets

(56) References Cited

U.S. PATENT DOCUMENTS

| | | | |
|---|---|---|---|
| 2018/0075527 A1 | 3/2018 | Nagla et al. | |
| 2018/0089761 A1* | 3/2018 | Stradling et al. | |
| 2018/0240114 A1* | 8/2018 | Li | G06Q 20/40 |
| 2018/0349621 A1* | 12/2018 | Schvey et al. | G06F 21/62 |
| 2019/0314726 A1* | 10/2019 | Masini | A63F 13/71 |
| 2020/0044854 A1* | 2/2020 | Hsueh | H04L 29/06 |
| 2020/0195421 A1* | 6/2020 | Gagnon | H04L 9/06 |
| 2020/0210451 A1* | 7/2020 | Wang | G06F 16/27 |
| 2020/0250655 A1* | 8/2020 | Naqvi et al. | G06Q 20/36 |

OTHER PUBLICATIONS

Deepak K. Tosh et al., Cloud PoS: A Proof-of-Stake Consensus Design for Blockchain Integrated Cloud, 2018, IEEE 11th International Conference on Cloud Computing. (Year: 2018).*

Dhiroj Pattanayak, "OneLedger—A Universal Blockchain protocol enabling cross-ledger access through business modularization", Jun. 5, 2018, p. 1.

"EOS.IO Technical White Paper v2", Github: Documentation/TechnicalWhitePaper, Apr. 28, 2018, pp. 1-30.

Sébasitien Andreina, et al., "PoTS—A Secure Proof of TEE-Stake for Permissionless Blockchains",IACR Cryptology ePrint Archive 2018, Dec. 12, 2018, pp. 1-19.

Sarah Azouvi, et al., „Betting on Blockchain Consensus with Fantômette, arXiv:1805.06786v2 [cs.CR], Aug. 8, 2018, pp. 1-16.

* cited by examiner

METHODS OF ELECTING LEADER NODES IN A BLOCKCHAIN NETWORK USING A ROLE-BASED CONSENSUS PROTOCOL

FIELD

The present invention relates to blockchains and blockchain networks and, in particular, to a role-based consensus protocol in a blockchain network.

BACKGROUND

The blockchain has been gaining increasing attention recently, motivated largely by the wide success of the Bitcoin cryptocurrency. To reach distributed agreement, the blockchain relies on consensus protocols which ensure that all nodes in the network share a consistent view on a common distributed ledger. Most existing blockchain systems rely on Bitcoin's Proof-of-Work (PoW) consensus protocol to reach network consensus in permission-less systems that do not require the knowledge of nodes' identities. PoW relies on the computation resources of the nodes to periodically elect a random leader to propose a new block of transactions to be included in the ledger. Another consensus protocol with increasing popularity is Proof-of-Stake (PoS), which leverages virtual resources, such as the stake of a node, to perform a leader election process.

Different stakeholders play different roles in the blockchain network, however this difference is not well represented in existing leader election processes in the existing consensus protocols. For example, in the PoW consensus process, there are roles such as miners and clients. The miners invest hardware to solve computation puzzles in order to be elected as leaders, while the clients issue transactions to the network. Miners do not necessarily care about the validity of the transactions, though they have most of the power to decide which transactions are to be included in the ledger and in which order. In another example, with the PoS consensus protocol, the amount of stake or assets belonging to each account does not capture the intended voting power of the associated stakeholders. For example, in the use case of supply chain management, sellers' capabilities should be measured in terms of how much assets (e.g., products) they are able to sell, rather than possess. Therefore, current PoS protocols may encourage sellers to hoard the assets instead, while a healthy supply chain would value quick turnover of the assets.

SUMMARY

In an embodiment, a method is provided for electing a leader node using a role-based consensus protocol in a blockchain network. The method includes a node generating a new block in the blockchain network, computing an effective resources metric for the node based on a role of the node, resources of the node and a role-based weight profile for the resources of the node, generating eligibility proof based on eligibility information, the eligibility information including a blockheader of the new block, an identity of the node, a difficulty target, T, of the blockchain network, and the effective resources metric, and broadcasting the new block and the eligibility proof to the blockchain network, to enable one or more other nodes in the blockchain network to verify eligibility of the node as a leader.

BRIEF DESCRIPTION OF THE DRAWINGS

Embodiments of the present invention will be described in greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
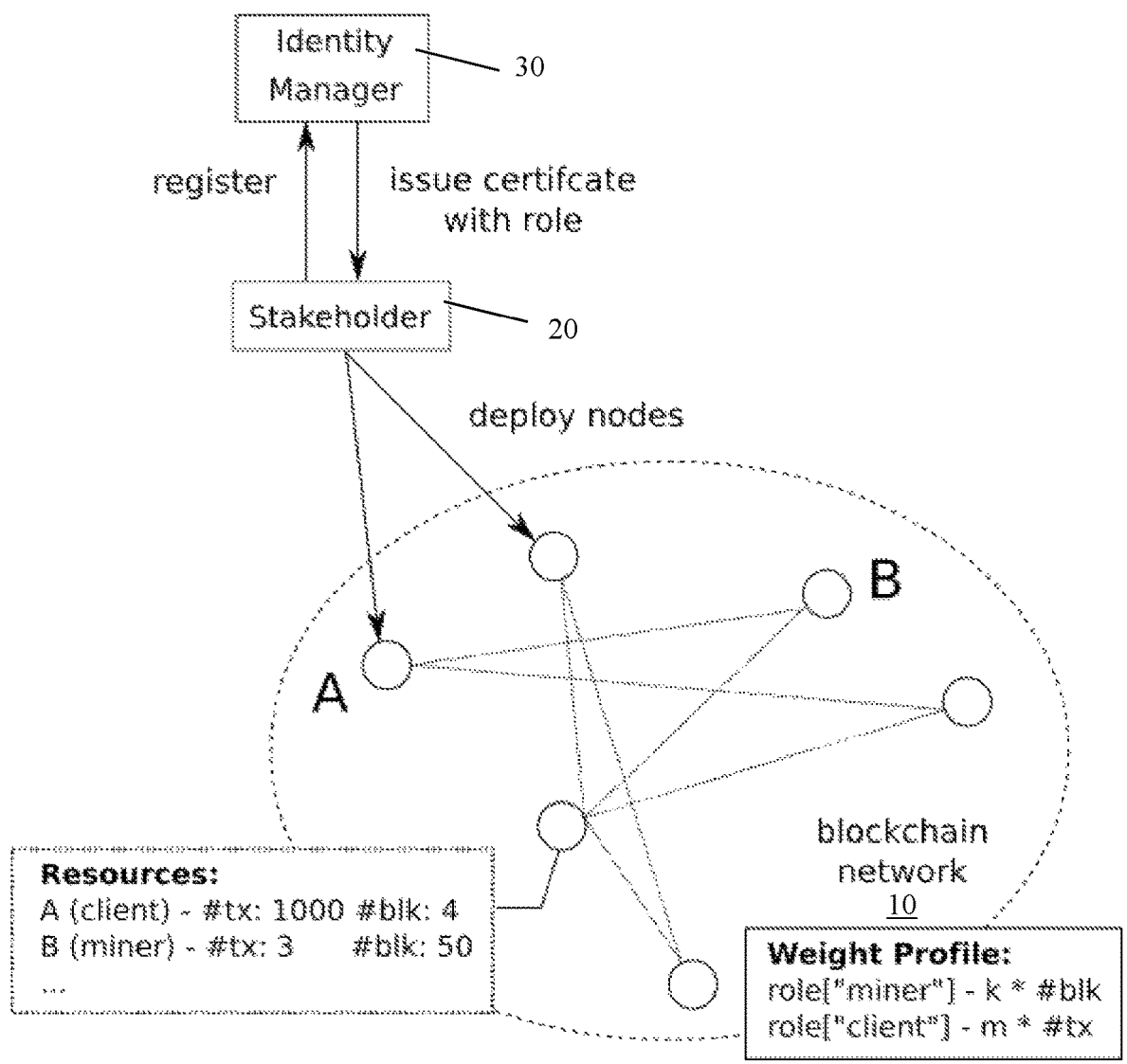
FIG. 1 shows an example blockchain system architecture with a role-based consensus protocol according to an embodiment.

According to an embodiment, a role-based consensus protocol is provided, in which the mining power is decided based on specific roles of the stakeholders, either in the use case or in the blockchain network. The probability of being elected as a leader node in the network does not only depend on the mining resources, either computation resources or the amount of stake, but also takes into account the role of the stakeholders. As a result, the voting power is distributed across the stakeholders in a more reasonable way that will contribute to a more fair election scheme.

According to an embodiment, a method is provided for electing a leader node using a role-based consensus protocol in a blockchain network. The method includes generating a new block by a node in the blockchain network, computing an effective resources metric for the node based on a role of the node, resources of the node and a role-based weight profile for the resources of the node, generating eligibility proof based on eligibility information, the eligibility information including a blockheader of the new block, an identity of the node, and the effective resources metric, and broadcasting the new block and the eligibility proof to the blockchain network, to enable one or more other nodes in the blockchain network to verify eligibility of the node as a leader node.

In an embodiment, the eligibility information further includes a difficulty target, T, of the blockchain network.

In an embodiment, the blockchain network is a permission based blockchain network, and wherein the method further includes sending a registration request to an identity manager entity, and receiving account credentials for the node from the identity manager entity, the account credentials including the identity of the node and the role of the node.

In an embodiment, the eligibility information further includes the account credentials of the node.

In an embodiment, the blockchain network is a permission-less blockchain network, and wherein the identity of the node and the role of the node are stored in a ledger of the blockchain network.

In an embodiment, the effective resources metric includes an effective stake metric, and wherein the resources include an amount of stake resource of the node.

In an embodiment, the effective resources metric includes an effective mining power metric, and wherein the resources include mining resources of the node.

In an embodiment, the effective mining power is determined according to $P_R = f_R(\vec{W_R}, \vec{M})$, where $P_R$ is the effective mining power of the node [in its current role], where M is a set of one or more mining resources of the node, $W_R$ is a weight profile of the mining resources of the node according to the role of the node, and $f_R$ is a function according to the role of the node.

In an embodiment, the role of the node is defined based on how one or more assets are handled by the node, and wherein each of the one or more assets includes one or more asset attributes. The role may be decided by an identity manager entity.

In an embodiment, the role-based weight profile includes different roles, and for each role includes different weights for the one or more attributes of each of the one or more assets.

According to another embodiment, a node of a blockchain network is provided. The node includes one or more computational processors with a local disk space containing a copy of a blockchain of the blockchain network, the computational processors, alone or in combination, being configured to provide for execution of a method including steps of generating a new block by a node in the blockchain network computing an effective resources metric for the node based on a role of the node, resources of the node and a role-based weight profile for the resources of the node, generating eligibility proof based on eligibility information, the eligibility information including a blockheader of the new block, an identity of the node, and the effective resources metric, and broadcasting the new block and the eligibility proof to the blockchain network, to enable one or more other nodes in the blockchain network to verify eligibility of the node as a leader node. In an embodiment, the eligibility proof also includes a difficulty target, T, of the blockchain network.

In an embodiment, the blockchain network is a permission based blockchain network, and wherein the method further includes sending a registration request to an identity manager entity, and receiving account credentials for the node from the identity manager entity, the account credentials including the identity of the node and the role of the node.

In an embodiment, the blockchain network is a permission-less blockchain network, and wherein the identity of the node and the role of the node are stored in a ledger of the blockchain network.

According to another embodiment, a non-transitory, computer-readable medium is provided that has instructions thereon which, after implementation on one or more computational processors with a local disk space containing a copy of a blockchain of a blockchain network, the computational processors, alone or in combination, provide for execution of a method including steps of generating a new block by a node in the blockchain network, computing an effective resources metric for the node based on a role of the node, resources of the node and a role-based weight profile for the resources of the node, generating eligibility proof based on eligibility information, the eligibility information including a blockheader of the new block, an identity of the node, and the effective resources metric, and broadcasting the new block and the eligibility proof to the blockchain network, to enable one or more other nodes in the blockchain network to verify eligibility of the node as a leader node. In an embodiment, the eligibility proof also includes a difficulty target, T, of the blockchain network.

In an embodiment, the blockchain network is a permission based blockchain network, and wherein the method further includes sending a registration request to an identity manager entity, and receiving account credentials for the node from the identity manager entity, the account credentials including the identity of the node and the role of the node.

In an embodiment, the blockchain network is a permission-less blockchain network, and wherein the identity of the node and the role of the node are stored in a ledger of the blockchain network.

According to another embodiment, a method is provided for electing a leader node using a role-based consensus protocol in a blockchain network. The method includes receiving a new block and eligibility proof broadcast by a block creator node in the blockchain network, computing an effective resources metric for the block creator node based on a role of the block creator node, resources of the block creator node and a role-based weight profile for the resources of the block creator node, verifying the eligibility proof based on eligibility information, the eligibility information including a blockheader of the new block, an identity of the block creator node, a difficulty target, T, of the blockchain network, and the effective resources metric, and electing the block creator node as a leader node and/or accepting the new block if both the new block and the eligibility proof are determined as valid.

Embodiments of the present invention provide methods that improves blockchain election or agreement processes or functionalities. Embodiments provide role-based consensus protocols that elect leader nodes according to the roles of nodes, either in the use case or in the blockchain network. In certain embodiments, the probability of being elected as a leader node in the blockchain network not only depends on the mining resources attributable to each network node, computation resources and/or the amount of stake, but also takes into account the roles of the nodes in the network. As a result, the voting power is advantageously distributed across the nodes in a way that will contribute to a more fair election scheme.

A blockchain network is typically composed of nodes which are computer devices (each typically including one or more processors and one or more memory devices) in the blockchain network that can assume the role of either regular clients or miners. Clients send and receive transactions, and contribute to the blockchain by relaying to their neighbors every transaction and block that they receive. Miners are clients than can validate transactions and aggregate the transactions into blocks and broadcast the blocks to the blockchain network so that every node can update its local copy of the blockchain stored in a memory device. Every node in a blockchain is a client, with some of the nodes additionally assuming the role of miners. Functions attributed to regular clients include full read access to the blockchain's ledger and sending and receiving transactions.

Regardless of the role covered, each network node has to store a local copy of the entire blockchain in order to validate new transactions and blocks. Such redundancy also helps against denial of service attacks. Additionally, ordinary clients store a local copy of the entire blockchain which may amount to hundreds of gigabytes of disk space.

Miners are clients that carry out additional tasks directed to extending and maintaining the blockchain. Miners also need to store a local copy of the entire blockchain. Their set of functionalities includes those of regular clients, with the following additions: validation of transactions, validation of blocks, and creation of new blocks by grouping a number of transactions.

The process of creating a new block requires the miner to solve a Proof-of-Work (PoW) which is a difficult computational puzzle. Block creation is designed to be a computational-resource-intensive operation to prevent malicious network peers from attempting to modify past blocks. In practice, the cost of modifying a block increases with every new block added to the blockchain.

In a distributed blockchain system every involved stakeholder maintains one or multiple nodes in the network. The transaction messages are broadcast in the system to the related nodes or all nodes. Every node in the system validates the received transaction messages. In each epoch or time period, nodes that desire to propose the next transaction or batch of transactions (i.e., a block) to be included in the ledger compute some eligibility proof. If a node is eligible, it may be elected as the leader in this epoch and broadcasts the proposed block to the network along with the eligibility proof that can be verified by other nodes. If a node agrees with the received block, it appends it to the local copy of the ledger. The blockchain network can be permission-based or permission-less, depending on the specific use case.

FIG. 1 shows an example blockchain system architecture with a role-based consensus protocol. A stakeholder 20 may register with an identity manager entity 30, which issues a certificate including the identity and the role of the stakeholder node 20. Identity manager 30 may be a standalone device controlled by a neutral third party or may be a device controlled or operated by a stakeholder. Stakeholder 20 may deploy one or more nodes in the blockchain network 10. As an example, in FIG. 1, stakeholder 20 has two deployed nodes in blockchain network 10, including stakeholder Node A. Blockchain network 10 includes multiple other nodes, including node B deployed by another stakeholder. The certificates issued by identity manager entity 30 are used to initialize blockchain nodes in the network. The blockchain nodes may extract additional information from the ledger that may be relevant to the resources for electing the leader. For example, the ledger may include an identification of resources of the nodes and a role-based weight profile. The ledger may also include role information for each node. As shown in the specific example in FIG. 1, stakeholder node A is acting as a client and stakeholder node B is acting as a miner. Further, the example weight profile indicates weights (e.g., k and m) to be applied to certain resource(s) (e.g., number of transactions issued, #tx, or number of blocks generated, #blk) depending on the role (e.g., client or miner). The role-based weight profile and its parameters may be set, e.g., by identity manager 30 or other entity in blockchain network 10. In some cases, the role-based weight profile may be modified, e.g., by the same entity that created the profile.

Resources may include mining resources and/or stake resources. Examples of resources include computational resources, memory resources, time resources, number of issued transactions, number of new blocks generated, amount of stake, etc.

In certain embodiments, an effective resources metric is generated, or computed, by a node for use in determining or computing eligibility of proof. For example, node A may generate an effective resources metric based on its role (client), resources of node A, and the weight profile for client. Similarly, node B may compute an effective resources metric based on its role (miner), resources of node B, and the weight profile for miner. The effective resources metric may include an effective mining power metric and/or an effective stake metric, depending on the particular use case or blockchain network, as two examples.

According to an example embodiment, the mining resources are defined to be $\vec{M}$, where $\vec{M}$ can be a combination of different resources, such as computation, memory space, and stake. Also, the roles of nodes are defined to be R. Further, each role may be defined to have a different weight profile $\vec{W_R}$ on the mining resources. For a given node, the effective mining power, which decides the probability of being elected as the leader, is computed based on the weight profile and the mining resources used in the consensus protocol: $P_R = f_R(\vec{W_R}, \vec{M})$. Note that the function $f_R$ can be different according to the role of the node. The roles as well as the weight profile of each role is defined by the consensus protocol and known to all nodes (see FIG. 1). The role of each node may be obtained either from the ledger state, or assigned by a trusted third party, such as an identity manager, and can be verified by all nodes.

The amount of mining resources of each node can include information extracted from the ledger, e.g., amount of stake, amount of sold objects, number of issued transactions, etc., and external resources such as computation, memory or time resources. Note that the resources possessed by a node are verifiable by all the other nodes in the network.

To generate an eligibility proof, a node first computes its own effective mining power $P_R = f_R(\vec{W_R}, \vec{M})$. Then the node generates or computes the eligibility proof. In an embodiment, the eligibility proof may be based on the blockheader of a new block that the node proposes, blkhdr, the network difficulty target, T, (which may be adjusted regularly), the node's identity, e.g., account credential, e.g., ($sk_{acct}$, $cert_{acct}$), where $sk_{acct}$ is the account private key and $cert_{acct}$ is the account certificate, and the effective mining power, e.g., $P_R$: $prf_{eligible}$=Gen(blkhdr,T,$sk_{acct}$,$cert_{acct}$,$P_R$). The result is then broadcast along with the proposed block to the network.

When a node receives a new (proposed) block, the node first checks the role of the node that generated the block (i.e., block generator or block creator). The block creator node's role may be identified either using that node's account certificate if roles are assigned by an identity manager, or derived from the state in the ledger. Then the node recomputes the effective mining power of the block creator node $P_R = f_R(\vec{W_R}, \vec{M})$ and verifies the eligibility proof, e.g., Ver (blkhdr,T,$cert_{acct}$,$P_R$,$prf_{eligible}$)=true/fals.

The node accepts the new block if both the block and the eligibility proof of the block generator are valid.

In the following, two example embodiments of computing effective mining power are discussed. In the first embodiment, a supply chain management use case with a role-based proof-of-stake consensus protocol is discussed. In the second embodiment, a simple payment system without specific roles in the use case is discussed.

Embodiment 1

In conventional proof-of-stake consensus protocols, every node in the network has an account and the associated balance. The account balance is defined by the amount of crypto-currencies or assets referred by the use case, and can be updated through transactions. The probability of obtaining a valid eligibility proof is proportional only to the amount of stake under the node's account.

In an embodiment, roles R are defined based on how assets are to be processed by each stakeholder according to the use case, for example, roles may include suppliers, manufactures, logistic distributors and sellers. Each role can be further refined to multiple levels based on the scale of the stakeholder, for example, whether a wholesaler or retailer in the role of seller. Moreover, the assets can have associated attributes such as delivery time, inventory time, production amount, supply amount, sale amount, etc. These asset attributes are considered as different dimensions in the mining resource $\vec{M}$, for example:

$$\vec{M} = \begin{pmatrix} asset.deliveryTime \\ asset.inventoryTime \\ asset.productionAmount \\ asset.supplyAmount \\ asset.saleAmount \end{pmatrix}$$

Note that in this use case example, the effective mining power in PoS is the effective stake.

In an embodiment, for a permission based network, an identity management scheme is implemented where all roles in the use case are defined. Before joining the network, the identity manager (e.g., identity manager entity 30) first identifies the stakeholders and issues the account credentials (i.e., private key pairs and certificates) corresponding to their roles.

For example, the role set in a supply chain management use case may be:

$\mathbb{R}$ =(logistics,producer,supplier,seller)

Different assets as well as different attributes of the assets are assigned with different weights according to a weight profile, $\vec{W_R}$, that is encoded in the consensus protocol. For example, the weight profile for a logistic distributor may be $\vec{W}_{l\ logistic}$=(m, 0, 0, n, 0), and for a seller $\vec{W}_{l\ seller}$=(0, r, 0, 0, s). In this example, the effective stake of a logistic distributor can be computed, using a specific function $f_R$, as $$P_{logistic} = \frac{n \times asset.supplyAmount}{m \times asset.deliveryTime},$$

and of a seller $$P_{seller} = \frac{s \times asset.saleAmount}{r \times asset.inventoryTime}.$$

Other functions, $f_R$, may be used as desired for the particular use case. Also, note that assets as well as the attributes of the assets may be derived from the transactions and stored as a global state associated to the account.

Embodiment 2

Some blockchains only consider a simple payment use case, where transactions merely transfer cryptocurrencies among the nodes. In this case, the role of a node may be defined based on to what extent the node is involved in the consensus process. For example, certain roles might include light clients that only passively listen to transactions related to the light client; validators that validate and store each transaction/block received from the network; and miners that actively propose new transactions/blocks to be included into the ledger.

As an example, assuming that the original mining resource in the underlying consensus protocol is X, the mining resources on a role-based consensus protocol may be defined as:

$$\vec{M} = \begin{pmatrix} X \\ nBlocks \\ nTransactions \end{pmatrix}.$$

A miners' mining power remains to be decisive by X. Additionally, in this example, validators are able to be elected as leader based on the number of saved blocks, nBlocks, and light clients are able to be elected as leader based on the number of issued transactions, nTransactions. The role-based weight profile may be defined to more evenly distribute probabilities of election amongst all roles. As a result, the voting power in the consensus process may be evenly distributed across all nodes in the blockchain network.

Embodiments of the present invention provide for various improvements and advantages, including combining multiple types of resources in the consensus protocol, and electing a leader by evaluating the effective resources based on the role of the blockchain node or stakeholder, and the role-based weight profile of those resources, which may be modified in some cases. Additional advantages include more evenly distributing the voting power and election probability across all nodes in the blockchain network.

Figure 2:
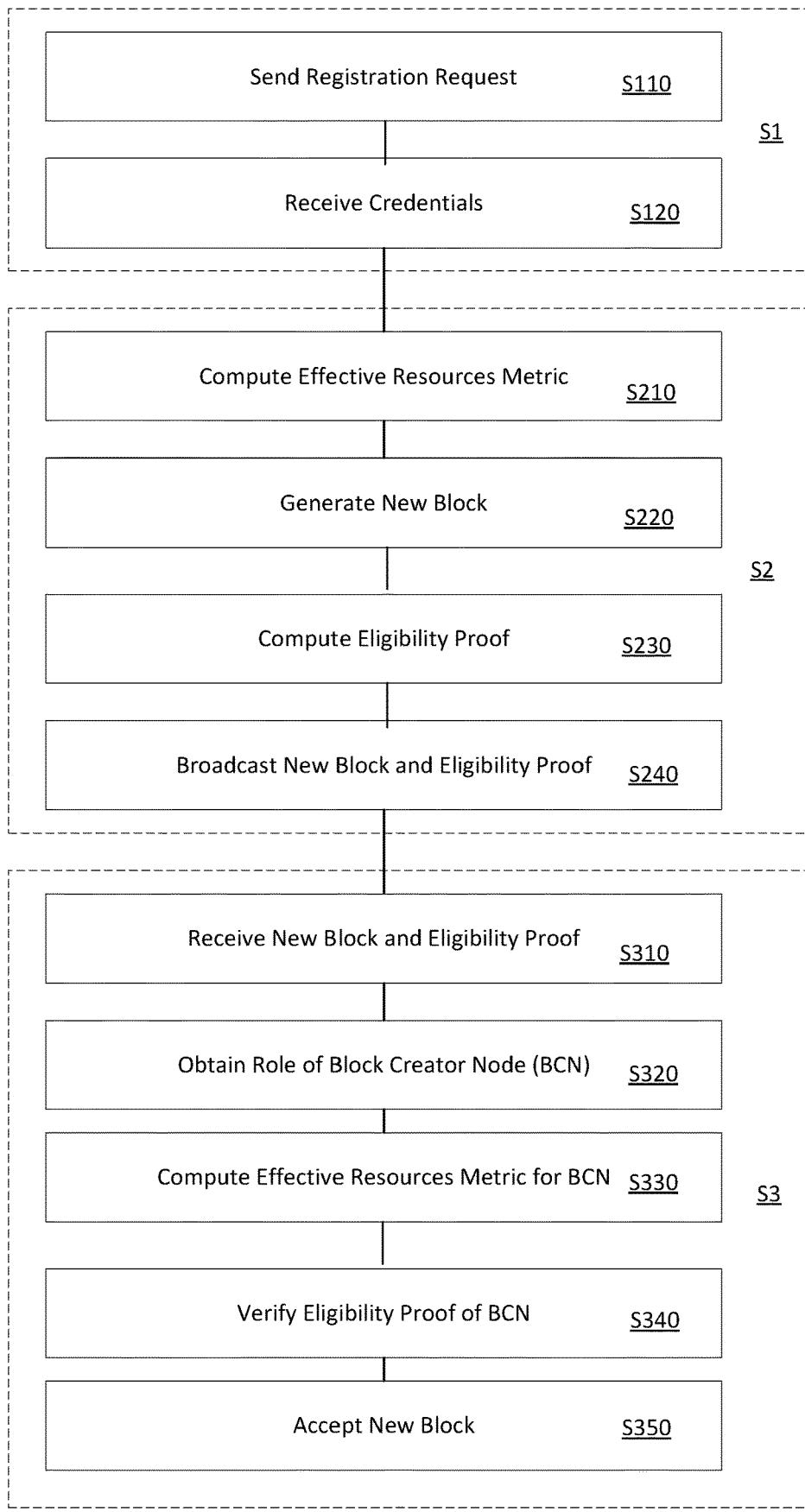
FIG. 2 illustrates a method of electing a leader node in a blockchain network using a role-based consensus protocol according to an embodiment.

FIG. 2 schematically illustrates a method of electing a leader in a blockchain network using a role-based consensus protocol according to an embodiment. Generally, method 200 includes an optional registration step S1, which is relevant for permission-based networks, a block generation and eligibility proof generation step S2, and a verification step S3. For permission-less networks, the method may begin as step S2, in which case the identity and role of nodes in the blockchain network are accessible in the ledger of the blockchain network. All nodes in the blockchain network are able to communicate with each other to share information and reach consensus on new blocks. Each of the nodes in the blockchain network is a computing device, including one or more processors and associated memory and storage. If consensus is reached, a new block is considered valid and is appended to the blockchain In Step S110, registration begins with an entity sending a request to register a node to an identity manager entity (e.g., identity manager entity 30) associated with the blockchain network. The request may be sent by a node, or in the case of a stakeholder deploying multiple nodes, by a node of the stakeholder or by a node management device associated with the stakeholder. The identity manager entity confirms the role of the node and creates credentials which may include the role of the node being registered and an identity of the node being registered. The identity manager entity may send the credentials back to the requesting device or node, or may create a certificate including the credentials, and send the certificate back to the requesting device or node. In step S120, the requesting device or node receives the credentials and may create an account with the blockchain network using the obtained credentials.

In step S210, a node in the blockchain network computes an effective resources metric for the node. The effective resources metric may include an effective mining resources power and/or an effective stake, and is computed using the role of the node, a set of one or more, or all, resources of the node and a role-based weight profile associated with resources of the node. In step S220, the node generates a new block to propose for the blockchain network. For example, the node generates a new block using one or more transactions received on the blockchain network. In step S230, the node computes eligibility proof. For example, the eligibility proof may be computed using eligibility information. Eligibility information used to compute the eligibility proof may include information in a header of the new block (blockheader), a difficulty target, T, of the blockchain network, the effective resources metric of the node (from step S210) and the identity of the node. T can be used as a reference value for a node to see if it is eligible to generate the next block. At step S240, the node (now a block creator node or BCN) broadcasts the new block and the eligibility proof to the blockchain network.

At step S310, a node (other than the BCN), receives the new block and eligibility proof broadcast by the BCN. In step S320, the receiving node retrieves or obtains the role of the BCN. The role may be obtained or retrieved from the network ledger or from the certificate for the BCN (e.g., by interacting with the ledger and/or the identity manager entity). In step S330, the receiving node computes an effective resources metric for the BCN. For example, the effective resources metric for the BCN may include an effective mining resources power and/or an effective stake, and is computed using the role of the BCN, the set of one or more, or all, resources of the BCN and the role-based weight profile associated with resources of the BCN. At step S340, the receiving node verifies the eligibility proof of the BCN. For example, the receiving node may compute eligibility proof using eligibility information that may include information in the header of the new block (blockheader), the difficulty target, T, of the blockchain network, the effective resources metric of the BCN (from step S330) and the identity of the BCN. At step S350, the receiving node accepts the new block broadcast by the BCN if the new block and the eligibility proof of the BCN are valid. The new block may be appended to the blockchain if consensus is reached.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for electing a leader node using a role-based consensus protocol in a blockchain network, the method comprising:
   generating a new block for a blockchain by a node in the blockchain network;
   computing an effective resources metric for the node based on a role of the node, multiple resources of the node and a role-based weight profile for each of the multiple resources of the node, wherein the role of the node is defined based on how one or more assets are handled by the node, wherein each of the one or more assets includes one or more asset attributes, wherein the role-based weight profile includes different roles, and for each role includes different weights for the one or more attributes of each of the one or more assets, and wherein the role of the node is stored in a ledger of the blockchain network and is accessible to all nodes in the blockchain network;
   generating eligibility proof based on eligibility information, the eligibility information including a blockheader of the new block, an identity of the node, and the effective resources metric; and
   broadcasting the new block and the eligibility proof to the blockchain network, wherein one or more other nodes in the blockchain network verify eligibility of the node as a leader node;
   accepting the new block in response to the new block and the eligibility proof being valid; and
   appending the new block to the blockchain.

2. The method according to claim 1, wherein the blockchain network is a permission based blockchain network, and wherein the method further includes:
   sending a registration request to an identity manager entity, and
   receiving account credentials for the node from the identity manager entity, the account credentials including the identity of the node and the role of the node.

3. The method according to claim 2, wherein the eligibility information further includes the account credentials of the node.

4. The method according to claim 1, wherein the blockchain network is a permission-less blockchain network, and wherein the identity of the node is stored in the ledger of the blockchain network.

5. The method according to claim 1, wherein the effective resources metric includes an effective stake metric, and wherein the resources include an amount of stake resource of the node.

6. The method according to claim 1, wherein the effective resources metric includes an effective mining power metric, and wherein the resources include mining resources of the node.

7. The method according to claim 6, wherein the effective mining power is determined according to $P_R = f_R(z,37,z,31)$, where $P_R$ is the effective mining power of the node in its current role, where M is a set of one or more mining resources of the node, $W_R$ is a weight profile of the mining resources of the node according to the role of the node, and $f_R$ is a function according to the role of the node.

8. A node of a blockchain network comprising one or more computational processors with a local disk space containing a copy of a blockchain of the blockchain network, the computational processors, alone or in combination, being configured to provide for execution of a method comprising:

generating a new block for the blockchain;
computing an effective resources metric for the node based on a role of the node, multiple resources of the node and a role-based weight profile for each of the multiple resources of the node, wherein the role of the node is defined based on how one or more assets are handled by the node, wherein each of the one or more assets includes one or more asset attributes, wherein the role-based weight profile includes different roles, and for each role includes different weights for the one or more attributes of each of the one or more assets, and wherein the role of the node is stored in a ledger of the blockchain network and is accessible to all nodes in the blockchain network;
generating eligibility proof based on eligibility information, the eligibility information including a blockheader of the new block, an identity of the node, and the effective resources metric;
broadcasting the new block and the eligibility proof to the blockchain network, wherein one or more other nodes in the blockchain network verify eligibility of the node as a leader node;
accepting the new block in response the new block and the eligibility proof being valid; and
appending the new block to the blockchain.

9. The node according to claim 8, wherein the blockchain network is a permission based blockchain network, and wherein the method further includes:
sending a registration request to an identity manager entity, and
receiving account credentials for the node from the identity manager entity, the account credentials including the identity of the node and the role of the node.

10. The node according to claim 8, wherein the blockchain network is a permission-less blockchain network, and wherein the identity of the node and the role of the node are stored in a ledger of the blockchain network.

11. A non-transitory, computer-readable medium having instructions thereon which, upon execution by one or more computational processors with a local disk space containing a copy of a blockchain of a blockchain network, cause the one or more computational processors, alone or in combination, to implement a method comprising:
generating a new block for the blockchain by a node in the blockchain network;
computing an effective resources metric for the node based on a role of the node, multiple resources of the node and a role-based weight profile for each of the multiple resources of the node, wherein the role of the node is defined based on how one or more assets are handled by the node, wherein each of the one or more assets includes one or more asset attributes, wherein the role-based weight profile includes different roles, and for each role includes different weights for the one or more attributes of each of the one or more assets, and wherein the role of the node is stored in a ledger of the blockchain network and is accessible to all nodes in the blockchain network;
generating eligibility proof based on eligibility information, the eligibility information including a blockheader of the new block, an identity of the node, and the effective resources metric;
broadcasting the new block and the eligibility proof to the blockchain network, wherein one or more other nodes in the blockchain network verify eligibility of the node as a leader node;
accepting the new block in response to the new block and the eligibility proof being valid; and
appending the new block to the blockchain.

12. The non-transitory, computer-readable medium according to claim 11, wherein the blockchain network is a permission based blockchain network, and wherein the method further includes:
sending a registration request to an identity manager entity, and
receiving account credentials for the node from the identity manager entity, the account credentials including the identity of the node and the role of the node.

13. The non-transitory, computer-readable medium according to claim 11, wherein the blockchain network is a permission-less based blockchain network, and wherein the role of the block creator node is obtained from a ledger of the blockchain network.

* * * * *